United States Patent [19]

Weil et al.

[11] 4,270,269

[45] Jun. 2, 1981

[54] COMBINATION PIPE-CUTTER AND DEBURRING TOOL

[75] Inventors: Manfred Weil, Frankfurt-Zeilsheim; Günter Rothenberger, Bad Homburg, both of Fed. Rep. of Germany

[73] Assignee: Firma Rothenberg GmbH & Co., Frankfurt am Main, Fed. Rep. of Germany

[21] Appl. No.: 31,908

[22] Filed: Apr. 29, 1979
(Under 37 CFR 1.47)

[30] Foreign Application Priority Data

Apr. 20, 1978 [DE] Fed. Rep. of Germany ... 7811884[U]

[51] Int. Cl.³ .............................................. B23D 21/10
[52] U.S. Cl. ......................................... 30/102; 7/158; 30/123
[58] Field of Search ................... 30/96, 101, 102, 123, 30/125, 136.5; 7/158

[56] References Cited

U.S. PATENT DOCUMENTS

| | | | |
|---|---|---|---|
| 1,738,496 | 12/1929 | Laux | 30/123 |
| 2,803,877 | 8/1957 | Belanger | 30/125 X |
| 3,796,765 | 3/1974 | Mattsson | 30/96 |

FOREIGN PATENT DOCUMENTS 547365 8/1956 Italy .......................................... 30/102

Primary Examiner—Z. R. Bilinsky
Attorney, Agent, or Firm—Sprung, Felfe, Horn, Lynch & Kramer

[57] ABSTRACT

Combination pipe-cutter and deburring tool especially for plastic pipe. A housing which can be positioned around the pipe to be cut, carries an adjustable cutter which has a spindle and a hollow grip handle. A separable deburring tool for removing the internal burr that remains after the pipe is cut fits into the hollow grip handle.

4 Claims, 3 Drawing Figures

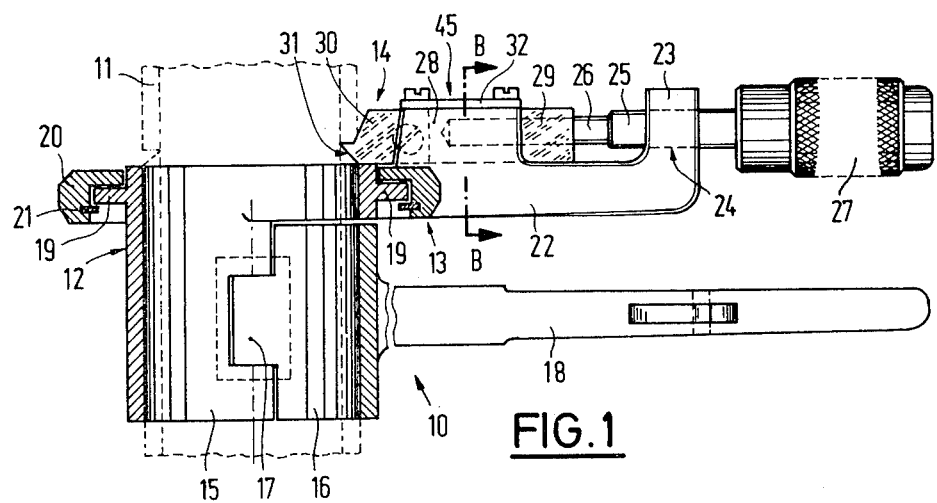
FIG. 1
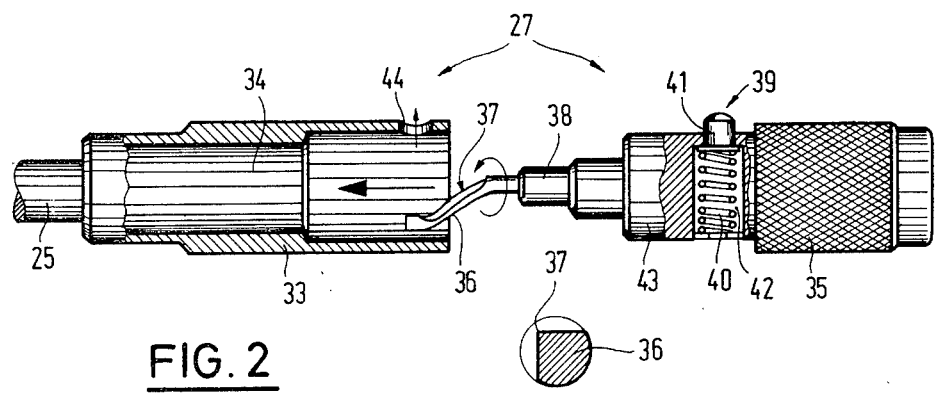
FIG. 2
FIG. 2a

COMBINATION PIPE-CUTTER AND DEBURRING TOOL

BACKGROUND

This invention relates to a pipe-cutter, particularly for plastic pipes, having a housing which can be moved around the pipe and a cutting device which is adjustable in the radical direction in relation to the housing by means of a spindle drive having a grip handle, and a guide for the rotation of the housing which engages the pipe.

Pipe-cutters of this kind are known. They are used for cutting pipes to length, and plastic pipes having an outside diameter of 100 millimeters or more can be dealt with manually with little expenditure of force. Cutting wheels or cutting rollers, as they are called, can be used as the cutting device in these operations, though in fact they have a squeezing action. Chip-removing tools, in the form of what are called parting-off tools, are also used. Part-off tools offer the advantage that, depending upon the finish of the cutting edges, precisely radial cut faces as well as conical, i.e., bevelled, faces, are obtained, the latter being of advantage in the further processing of the cut-to-length pipes.

The cutting devices of these tools are guided on or in the housing so that they can be displaced radially towards the pipe, and the housing in turn has a guide whereby it can be rotated relative to the pipe. The housing may take the form of a bowed member, and the guide in which it is rotated may consist of pairs of rollers which are backed by the outer face of the pipe. The guide may also consist of shells forming a cylinder, one of which has a closed guide ring which, in the manner of a flange, surrounds the pipe to be cut and on which a ring, forming part of the housing, is able to rotate by sliding.

Depending upon the configuration of the cutting device, it is possible to obtain a clean deburred cut edge at the outer circumference of the pipe or even to provide a bevelled edge. However, all the known cutting devices suffer from the disadvantage of creating, at the inner edge of the cut face, a more or less sharp burr. This presents a considerable risk of injury and is a hindrance when two lengths of pipe of different diameters but forming a small radial gap are required to be fitted telescopically one within the other. The burr has a particularly disadvantageous effect when an adhesive for connecting the lengths of pipe together in a tight manner is to be injected into the gap between the pipes. The burr then acts as a stripper for the adhesive, i.e., the adhesive does not move with the inner length of pipe into the outer length of pipe but is pushed back on the inner length so that a firm and tight connection between the pipes is no longer ensured. Hitherto, the fitter has always had to carry a special deburring tool along with him, and this is frequently not immediately available or at least not without special manipulations on the part of the fitter. In this connection, because of their sharp edges, some deburring tools cannot be conveniently carried in the pockets of overalls.

SUMMARY

This invention combines a pipe-cutter of the initially stated kind with a deburring tool in such a manner that the deburring tool is immediately available on the completion of the cutting operation.

According to the inventon and in the case of the initially described pipe-cutter, this is achieved in that the grip handle is hollow and has in its interior a removable deburring tool for removing the inner burr from the cut pipe.

DESCRIPTION

The grip handle, which serves to adjust the cutting device in several stages during a cutting operation as well as for rotating the device about the pipe, houses a deburring tool that cannot be mislaid, and the burring tool can be safely but detachably held in its interior by means of, for example, a screw connection, a bayonet connection or some other releasable latching connection. At the moment of use, the deburring tool can be easily removed from the grip handle and used; after use, it can be again inserted in the grip handle where it is protected against loss and dirt, while at the same time the user is protected against being injured by it. The resultant increased size of the grip handle even renders it easier to use, since it can be gripped more firmly. Special advantages accure if the grip handle is transversely divided, and if the part facing the spindle drive has a longitudinal bore, and if the other part forms a manipulator for the deburring tool and can be partly telescoped into the hollow part. In this case, the manipulator serves as a grip for the deburring tool when used, and furthermore, as an extension of the other part of the grip handle when the deburring tool is not required. The deburring tool can thus be incorporated in the grip handle in a discrete manner. With particular advantage, the latching device for connecting the deburring tool to the hollow part of the grip handle can be provided with a push-button which is movable radially of the axis of the grip handle against the bias of a spring. Such a latching device enables torque to be applied in both directions or rotation of the grip handle.

Particularly suitable for use with the arrangement in accordance with the innovation is a deburring tool known per se which is cranked in the manner of a triangular scraper and is rotatably mounted in the part serving as a manipulator, one edge being aligned with the axis of rotation. Such a deburring tool is roughly in the form of a screwdriver and is particularly suitable for incorporation in the grip handle. It has also proved particularly reliable and easy to use in the deburring of pipes of larger diameter.

An embodiment of the subject-matter of the invention will now be described in greater detail with reference to the attached drawings, in which:

FIG. 1 is a partial section through a complete pipe-cutter in the direction of the axis of the pipe, and a partial side view;

FIG. 2 is an exploded view of a grip handle having a hollow part and incorporating a deburring tool, and FIG. 2a is a cross-section through the material removing part of the deburring tool.

FIG. 1 illustrates a pipe-cutter 10 for parting off a pipe 11. It consists of a guide 12 for its rotation which is mounted on or pushed onto the pipe 11, and of a housing 13 incorporating a cutting device 14. The guide 12 is formed by two shells 15 and 16 forming a cylinder, which are pivotably interconnected by a hinge 17. The shell 16 can be clamped in relation to the shell 15 by means of a lever. A second lever, not shown, is connected to the shell 15. By pressing the two shells together, the guide 12 can be firmly clamped to the pipe 11. At the end that appears at the top in the drawing, the guide has a circumferential, i.e., a continuous guide ring 19 on which rotatably slides a ring 20 forming part of the housing 13. A securing ring 21 is provided for connecting the guide ring 19 to the ring 20 so that they cannot become mislaid.

The housing 13 also comprises a radial extension 22, which is arranged on the ring 20 and which, at its free end, has an angled portion 23 having an internal screw-thread 24 for a spindle 25. The spindle 25 is continued as a further spindle 26 which has a smaller diameter of thread. The pitch of the spindle 25 is opposite to that of the spindle 26. At its other end, the spindle 25 has a grip handle 27, the details of which will be described in connection with FIG. 2.

Two guide jaws 28 are provided on the radial extension 22 at the same side as the angled member 23. Only the forward jaw is visible in FIG. 1, and the two jaws define a recess which serves as a longitudinal guide for a holder 29 carrying a parting-off tool 30. The parting-off tool 30 has a cutting edge 31 which can be advanced into the material of the pipe 11. This is done by means of the spindles 25 and 26 by rotating the grip handle 27. The spindle 26 engages an inner thread in the tool holder 29. The tool holder 29 is firmly held between the guide jaws 28 by means of a locking plate 32. When the pipe-cutter 10 is in use, the extension 22 is moved, by means of the grip handle 27 and the ring 20, around the guide 13 and therefore around the pipe 11, the cutting edge being adjusted in stages by means of the grip handle 27 until the pipe portion disposed beyond the guide 12 is parted-off.

Referring to FIG. 2, the grip handle 27 comprises a hollow part 33 which faces the spindle 25 and has a coaxial longitudinal bore 34. A further part 35, the outside diameter of which corresponds to that of the part 33, is designed as a minipulator for a deburring tool 36 which is cranked and mounted to rotate in the part 35. As shown in FIG. 2a, the cross-section of the deburring tool 36 resembles that of a triangular scraper, one of its edges, i.e., the edge 37, being aligned with the axis of rotation of the deburring tool 36, which axis coincides with the longitudinal axis of the parts 33 and 35 of the grip handle. With such a deburring tool it is possible to remove the inner edges from lengths of pipe in an efficient manner, the part 35, acting as a manipulator, being moved parallel to the axis of the pipe on the periphery of the pipe, and the deburring tool 36 engaging the inner edge. Because of the cranked form and the rotatability of the deburring tool, the latter follows the periphery of the pipe while in constant contact with the edge 37. The pivotal mounting for the deburring tool 36 is contained in an extension 38 of the part 35.

The part 35, acting as a manipulator, is provided with a locking device 39 which has push-button 41 which is movable radially of the axis of the grip handle against the bias of a spring 40. The spring and push-button are accommodated in a diametral bore 42 in a cylindrical extension 43 of the part 35. This extension 43, together with the deburring tool 36, can be inserted in the longitudinal bore 44 of the part 33, the push-button 41 being held against outward movement by a radial bore 44 formed in the hollow part 33 as soon as the part 35 has reached the end position intended for the purpose. The hollow part 3 as well as the part 35 form a continuous grip handle 37 as shown in FIG. 1. Both of the parts 33 and 35 are provided with knurling on their outer faces.

What is claimed is:

1. A pipe-cutter comprising: housing means positionable around a pipe to be cut, cutting means and spindle drive means having a grip handle for radially adjusting the cutting means in relation to the housing means, said grip handle being transversely divided, one part thereof facing the cutting means having a longitudinal bore, and the other part separable therefrom and comprising a manipulator for a deburring tool and having cranked scraper means rotatably mounted therein and telescopable into said bore together with at least part of the length of the manipulator.

2. The pipe-cutter of claim 1, wherein the manipulator has locking means which engages in and mates with said longitudinal bore.

3. The pipe-cutter of claim 2, wherein the locking means comprises a spring loaded push-button which is radially movable towards the axis of the grip handle.

4. The pipe-cutter of claim 1, wherein the cranked scraper means includes a triangular scraper having one edge aligned with the axis of rotation.

* * * * *

UNITED STATES PATENT AND TRADEMARK OFFICE
CERTIFICATE OF CORRECTION

PATENT NO. : 4,270,269
DATED : Jun. 2, 1981
INVENTOR(S) : Manfred Weil et al

It is certified that error appears in the above-identified patent and that said Letters Patent are hereby corrected as shown below:

Title Page Filed    Delete "Apr. 29" and insert --Apr. 20--.

Signed and Sealed this

Twenty-seventh Day of October 1981

[SEAL]

Attest:

Attesting Officer

GERALD J. MOSSINGHOFF

Commissioner of Patents and Trademarks